(12) United States Patent
Van De Woestyne et al.

(10) Patent No.: US 12,724,118 B2
(45) Date of Patent: Sep. 1, 2026

(54) END-OF-SEASON STALK NITRATE SENSOR

(71) Applicant: Deere & Company, Moline, IL (US)

(72) Inventors: Bradley W. Van De Woestyne, West Des Moines, IA (US); Timothy A. Wilcox, Cissna Park, IL (US)

(73) Assignee: Deere & Company, Moline, IL (US)

( * ) Notice: Subject to any disclaimer, the term of this patent is extended or adjusted under 35 U.S.C. 154(b) by 432 days.

(21) Appl. No.: 18/471,454

(22) Filed: Sep. 21, 2023

(65) Prior Publication Data

US 2025/0098582 A1 Mar. 27, 2025

(51) Int. Cl.
*G01S 7/41* (2006.01)
*A01D 41/127* (2006.01)
(Continued)

(52) U.S. Cl.
CPC ............ *G01S 7/412* (2013.01); *A01D 41/127* (2013.01); *G01G 9/005* (2013.01); *G01N 22/00* (2013.01); *G01S 13/88* (2013.01); *G06Q 50/02* (2013.01); *A01D 41/141* (2013.01); *A01D 45/021* (2013.01); *A01D 45/028* (2013.01);
(Continued)

(58) Field of Classification Search
CPC ........ G01S 7/412; G01S 7/4802; G01S 13/87; G01S 13/88; G01S 13/931; G06Q 50/02; G01N 2021/8466; G01N 22/00; G01N 21/3581; G01G 19/08; G01G 9/005; A01D 45/028; A01D 45/021; A01D 41/141; A01D 41/127
See application file for complete search history.

(56) References Cited

U.S. PATENT DOCUMENTS 5,461,229 A * 10/1995 Sauter .................... G01N 33/24 250/341.2
6,138,590 A * 10/2000 Colburn, Jr. ........... A01C 23/02 47/1.3
(Continued)

FOREIGN PATENT DOCUMENTS

CN 106875284 A * 6/2017 ........... A01C 21/005
DE 102004038404 A1 2/2006
(Continued)

OTHER PUBLICATIONS

German Search Report issued in application No. 102024122377.4 dated Mar. 14, 2025, 10 pages.
(Continued)

*Primary Examiner* — Arpad Fabian-Kovacs
(74) *Attorney, Agent, or Firm* — Lucian Wayne Beavers; Patterson Intellectual Property Law, PC

(57) ABSTRACT

An agricultural machine configured to harvest a crop having stalks includes a main frame and a plurality of wheels supporting the main frame from the ground. A crop header is mounted on the main frame and includes a header frame extending transversely to a forward direction and having a transverse width. The crop header is configured to cut stalks of the crop as the agricultural machine moves in the forward direction. At least one on-the-go nitrate sensor is mounted on the agricultural machine and oriented to collect electromagnetic energy reflected from or emitted by the stalks, the sensor being configured to generate a nitrate level signal representative of a nitrate level in the stalks.

18 Claims, 5 Drawing Sheets

(51) Int. Cl.

| | |
|---|---|
| ***G01G 9/00*** | (2006.01) |
| ***G01N 22/00*** | (2006.01) |
| ***G01S 13/88*** | (2006.01) |
| ***G06Q 50/02*** | (2012.01) |
| *A01D 41/14* | (2006.01) |
| *A01D 45/02* | (2006.01) |
| *G01G 19/08* | (2006.01) |
| *G01N 21/3581* | (2014.01) |
| *G01N 21/84* | (2006.01) |
| *G01S 7/48* | (2006.01) |
| *G01S 13/87* | (2006.01) |
| *G01S 13/931* | (2020.01) |

(52) U.S. Cl.

CPC ......... *G01G 19/08* (2013.01); *G01N 21/3581* (2013.01); *G01N 2021/8466* (2013.01); *G01S 7/4802* (2013.01); *G01S 13/87* (2013.01); *G01S 13/931* (2013.01)

(56) References Cited

U.S. PATENT DOCUMENTS

| | | | | |
|---|---|---|---|---|
| 6,421,990 | B1 | 7/2002 | Ohlemeyer et al. | |
| 6,484,652 | B1 * | 11/2002 | Colburn, Jr. | A01C 21/007 47/1.3 |
| 6,853,937 | B2 * | 2/2005 | Shibusawa | A01B 79/005 702/100 |
| 6,956,381 | B2 | 10/2005 | Dahan | |
| 7,176,697 | B1 | 2/2007 | Dahan | |
| 8,201,388 | B1 | 6/2012 | Vandeven et al. | |
| 8,204,689 | B2 * | 6/2012 | Christy | G01N 21/359 702/28 |
| 8,381,582 | B2 | 2/2013 | Dahan | |
| 8,444,937 | B2 * | 5/2013 | Tuli | G01N 33/245 422/534 |
| 8,472,023 | B2 * | 6/2013 | Preiner | G01N 21/276 356/336 |
| 9,891,629 | B2 | 2/2018 | Murray et al. | |
| 10,345,283 | B1 * | 7/2019 | Laird | C05C 11/00 |
| 10,564,122 | B1 * | 2/2020 | Xu | G01N 27/44791 |
| 10,820,475 | B2 | 11/2020 | Zemenchik et al. | |
| 10,993,373 | B2 | 5/2021 | Meschke et al. | |
| 11,175,223 | B2 | 11/2021 | Dahan et al. | |
| 2003/0071637 | A1 | 4/2003 | Dahan | |
| 2006/0026939 | A1 * | 2/2006 | Kormann | A01D 43/085 56/10.2 E |
| 2009/0038390 | A1 | 2/2009 | Dahan | |
| 2017/0049044 | A1 * | 2/2017 | Stoller | A01C 7/201 |
| 2017/0316124 | A1 * | 11/2017 | Lee | A01B 79/005 |
| 2017/0339827 | A1 * | 11/2017 | Anderson | A01D 41/1273 |
| 2019/0057461 | A1 * | 2/2019 | Ruff | G01N 33/24 |
| 2019/0357425 | A1 * | 11/2019 | Dharna | A01B 79/005 |
| 2020/0045898 | A1 * | 2/2020 | Arriaza | A01C 21/007 |
| 2020/0072737 | A1 | 3/2020 | Dahan et al. | |
| 2020/0272971 | A1 * | 8/2020 | Ruff | G06Q 50/02 |
| 2022/0113142 | A1 * | 4/2022 | Vandike | G06F 16/29 |
| 2022/0229036 | A1 | 7/2022 | Arnon et al. | |
| 2022/0408643 | A1 * | 12/2022 | Somarowthu | G01S 7/412 |
| 2023/0243761 | A1 * | 8/2023 | Somarowthu | A01F 15/08 701/50 |

FOREIGN PATENT DOCUMENTS

| | | | | |
|---|---|---|---|---|
| DE | 102015213037 | A1 | 2/2016 | |
| DE | 102017104009 | A1 | 8/2018 | |
| DE | 102019105982 | A1 | 9/2020 | |
| DE | 112014000914 | B4 * | 8/2024 | G01N 33/24 |
| EP | 3095313 | A1 * | 11/2016 | G01N 3/30 |
| EP | 3395147 | A1 * | 10/2018 | A01B 76/00 |
| EP | 4548743 | A1 * | 5/2025 | G01S 13/89 |

OTHER PUBLICATIONS

"Late Season Cornstalk Nitrate Test" , PennState Extension (Oct. 5, 2009) (5 pages).

"End of Season Com Stalk Nitrate Test" Michigan State Univ. (Aug. 24, 2011)(3 pages).

"Use of the End-of-Season Corn Stalk Nitrate Test in Iowa Com Production", Iowa State Univ., CROP 3154 (Jul. 2018) (5 pages)

"Performing a Corn Stalk Nitrate Test", Crop Science US, (Aug. 6, 2019) (5 pages).

"Real-time monitoring of nitrate" Yeshno, et al., Hydrology and Earth System Sciences 23, 3997-4010 (2019)(14 pages).

"How to take and interpret the basal stalk nitrate test", blog-crop-news.extension.unm.edu (2020)(4 pages).

"Researchers Introduce Sensor for Real-time Measurement of Soil Nitrate", Seed World (Jan. 13, 2020)(2 pages).

"Water and nitrogen in-situ imaging" Zhang, et al. , Plant Methods (2021)(11 pages).

"Laser-induced breakdown spectroscopy" (undated but admitted to be prior art) (7 pages).

* cited by examiner

END-OF-SEASON STALK NITRATE SENSOR

FIELD OF THE DISCLOSURE

The present disclosure relates to systems for testing of nitrogen concentrations in a corn field or in a field of other crops having stalks.

BACKGROUND

Nitrogen is a challenging nutrient to manage in a midwestern US corn crop because: (1) it is needed in large quantities throughout the growing season; (2) the prominent form of nitrogen, nitrate, is relatively mobile in the soil and can easily be lost through leaching or denitrification; and (3) approximately half of nitrogen taken up by a corn crop is derived from mineralization of nitrogen from the soil whereas the other half is derived from commercially prepared fertilizer. It is also challenging for the corn grower to assess the performance of nitrogen management practices used in their farm operation. One tool used by growers is the End-of-season stalk nitrate test.

Corn plants deficient of nitrogen remobilize nitrates in the lower stalk of the developing grain. This remobilization reduces the nitrate concentrations in the lower stalk. Inversely, when corn plants have more nitrogen than is needed, nitrate concentrations increase in the lower stalk and indicate an excess of nitrogen.

Although the End-of-season stalk nitrate test is useful, there are limitations in the adaption of the test by corn producers. The test should be performed shortly after R6 stage of corn development and before harvest. Growers are often occupied with preparing or harvesting other crops during this period. Secondly, manual collection of samples is labor-intense, so it usually occurs only at a limited number of points in a field. Fewer testing locations increases the likelihood that spatial variability of nitrogen in the field is not captured by the testing. And lastly, sampling is a destructive process, so corn ears of the sampled plants are not easily harvested with the combine.

There is a need for improved systems for nitrogen management in a corn field.

BRIEF SUMMARY

In one embodiment an agricultural machine configured to harvest a crop having stalks includes a main frame and a plurality of wheels or tracks supporting the main frame from a ground surface to drive the agricultural machine in a forward direction to harvest the crop. A crop header is mounted on the main frame and includes a header frame extending transversely to the forward direction and having a transverse width. The crop header is configured to receive stalks of the crop to be cut by the crop header as the agricultural machine moves in the forward direction. At least one on-the-go nitrate sensor is mounted on the agricultural machine and is oriented to collect electromagnetic energy reflected from or emitted by the stalks, the sensor being configured to generate a nitrate level signal representative of a nitrate level in the stalks.

In another embodiment a method is provided for automatically performing an end-of-season stalk nitrate test when harvesting a crop having stalks. The method includes steps of: harvesting the crop with a crop header including a header frame extending transversely to a forward harvesting direction, the crop header being configured to cut stalks of the crop as the agricultural machine moves in the forward harvesting direction; collecting electromagnetic energy reflected from or emitted by the stalks with at least one on-the-go nitrate sensor; and generating a nitrate level signal with the at least one on-the-go nitrate sensor representative of a nitrate level in the stalks.

Numerous objects, features and advantages of the embodiments set forth herein will be readily apparent to those skilled in the art upon reading of the following disclosure when taken in conjunction with the accompanying drawings.

DETAILED DESCRIPTION

Figure 1:
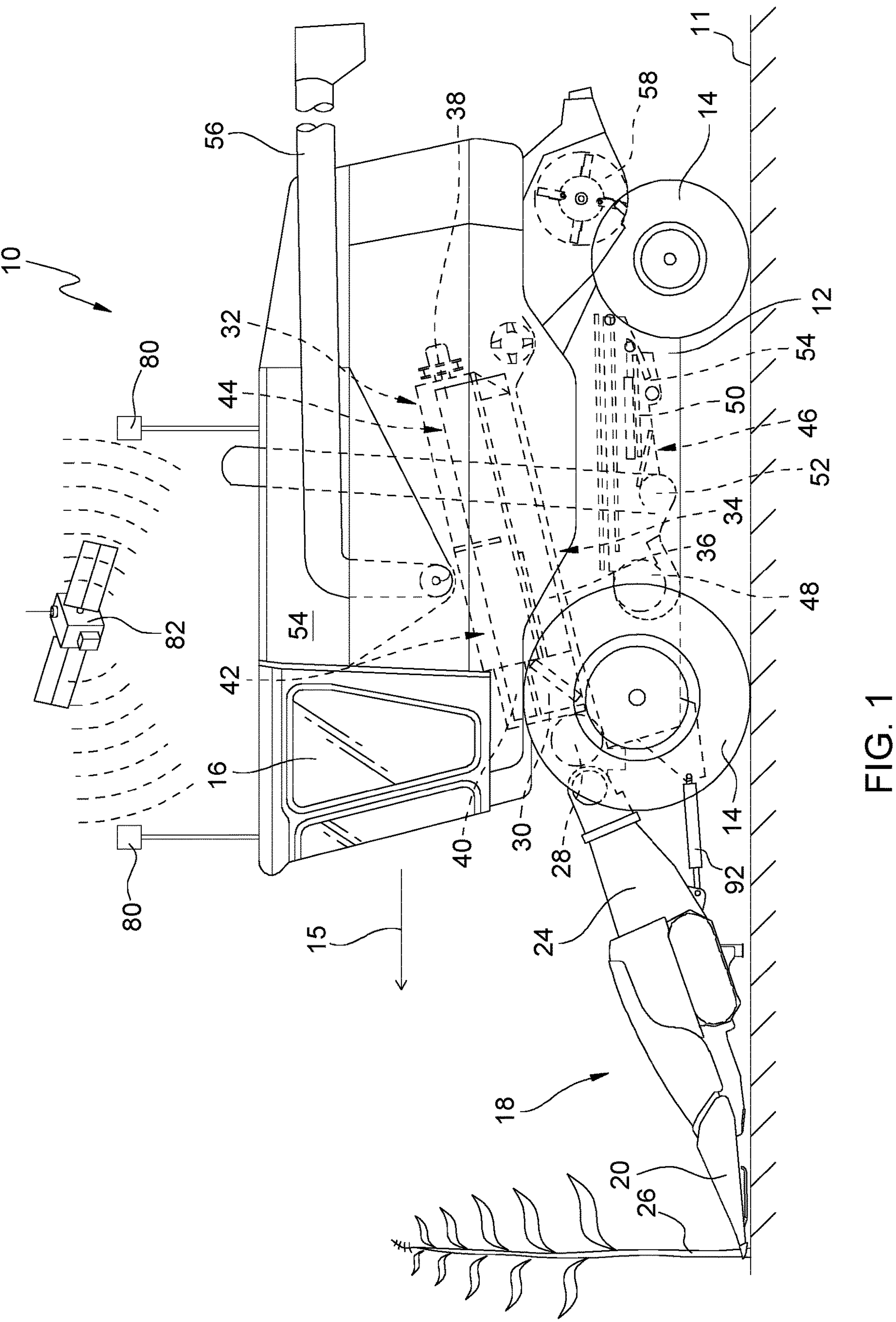
FIG. 1 is a side elevation view of a combine harvester machine.

FIG. 1 illustrates an embodiment of an agricultural machine in the form of a combine harvester 10 including a main frame 12 with wheels or tracks 14 in contact with the ground surface 11. Wheels 14 are coupled to the main frame 12 and are used for propulsion of the combine 10 in a forward operating or travelling direction 15. The operation of the combine 10 is controlled from an operator's cab 16. The operator's cab 16, in different embodiments, includes one or more controls (not shown) for controlling the operation of the harvester 10.

A corn header 18 is disposed at a forward end of the harvester 10 and includes a plurality of crop row dividers 20, also called snouts 20, to direct stalks 26 of corn into the corn header and to separate corn ears from the stalks. The corn ears are directed by a crop auger assembly 22 (see FIG. 2) and directed by a slope conveyor 24 toward a guide drum 28 which directs the corn ears to an inlet transition section 30. The inlet transition section 30 directs the cut crop to an axial harvested crop processing arrangement 32.

Corn header 18 may also be referred to as a row crop header or simply a crop header 18 mounted on the main frame 12 and including a header frame 19 extending transversely to the forward direction 15 and having a transverse width 21. The snouts 20 are attached to the header frame 19 and spaced across the transverse width 21 of the header frame 19 such that two adjacent snouts define a stalk receiving opening or space 62 therebetween for receiving the stalks 26 of the crop as the combine harvester 10 moves in the forward direction 15.

The harvested crop processing arrangement 32 may include a rotor housing 34 and a rotor 36 arranged therein. The rotor 36 includes a hollow drum 38 to which crop processing elements are fastened for a charging section 40, a threshing section 42, and a separating section 44. The charging section 40 is arranged at the front end of the axial harvested crop processing arrangement 32. A threshing section 42 and a separating section 44 are located downstream in the longitudinal direction and to the rear of the charging section 40. The drum 38 may be in the form of a truncated cone located in the charging section 40. The threshing section 42 may include a forward section in the form of a truncated cone and a cylindrical rear section. The cylindrical separating section 44 of the drum 38 is located at the rear or end of the axial harvested crop processing unit 32. In place of the axial harvested crop processing unit 32, a tangential threshing drum with a following axial threshing section or a straw chopper can also be used.

Corn and chaff that fall through a thresher basket associated with the threshing section 42 and through a separating grate associated with the separating section 44 may be directed to a cleaning system 46 with a blower 48 and sieves 50 with louvers. The sieves 50 can be oscillated in a fore-and-aft direction. The cleaning system 46 removes the chaff and guides the clean corn over a screw conveyor 52 to an elevator for clean corn (not shown). The elevator for clean corn deposits the clean corn in a corn tank 54. The clean corn in the corn tank 30 can be unloaded by means of an unloading screw conveyor 56 to a corn wagon, trailer, or truck (not shown). Harvested crop remaining at the lower end of the sieve 50 is again transported to the harvested crop processing arrangement 32 by a screw conveyor 54 and an overhead conveyor (not shown). The harvested crop residue delivered at the upper end of the sieve 50 that consists essentially of chaff and small straw particles may be conveyed by means of an oscillating sheet conveyor to a chopper rotor assembly 58.

Figure 2:
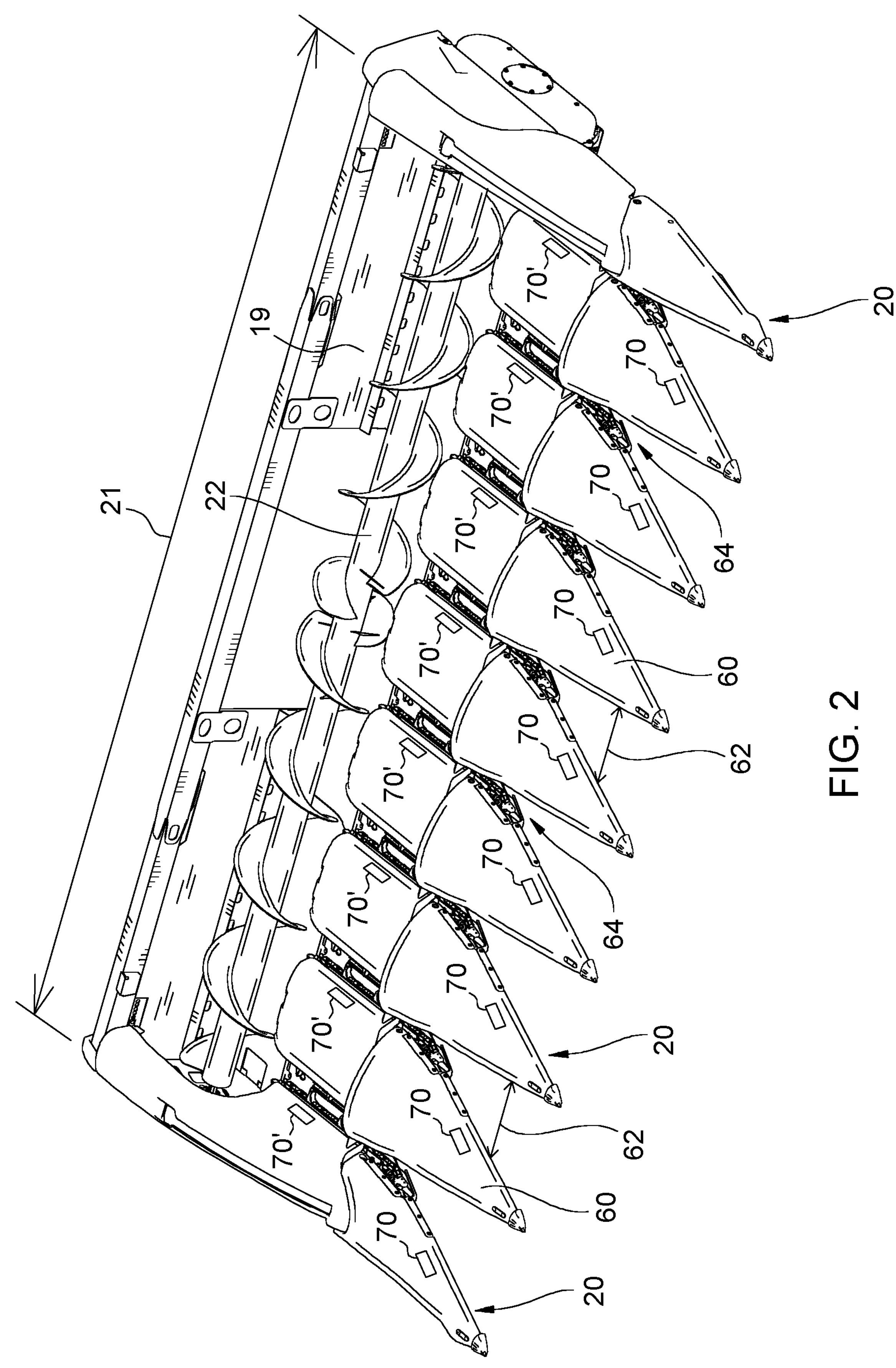
FIG. 2 is a perspective view of a corn row header.

As further illustrated in FIG. 2, the corn header 18 includes a plurality of crop row dividers 20 and the crop auger assembly 22. Each of the crop row dividers 20 includes a cone-shaped nose 60, wherein a space or stalk receiving opening 62 is defined between adjacent noses 60. The space 62 is generally aligned with a corn row by the operator or by an automatic guidance system that directs the corn harvester 10 along a row. As the corn harvester 10 moves forward, the corn stalks are directed to a deck assembly 64, also identified as a row unit 64.

The combine harvester 10 is provided with a nitrogen management system that allows nitrate levels in the stalks 26 to be monitored in real time during the harvesting operation. Although disclosed herein in the context of a combine harvester for corn, the nitrogen management system disclosed herein may be applied to other crops having stalks cut by a header of a harvesting machine.

At least one on-the-go nitrate sensor 70 is mounted on at least one of the snouts 20 and oriented to collect electromagnetic energy reflected from lower end portions of the stalks entering and passing through the stalk receiving openings 62. The sensor 70 is configured to generate a nitrate level signal 70S representative of a nitrate level in the lower end portions of the stalks 62.

Figure 3:
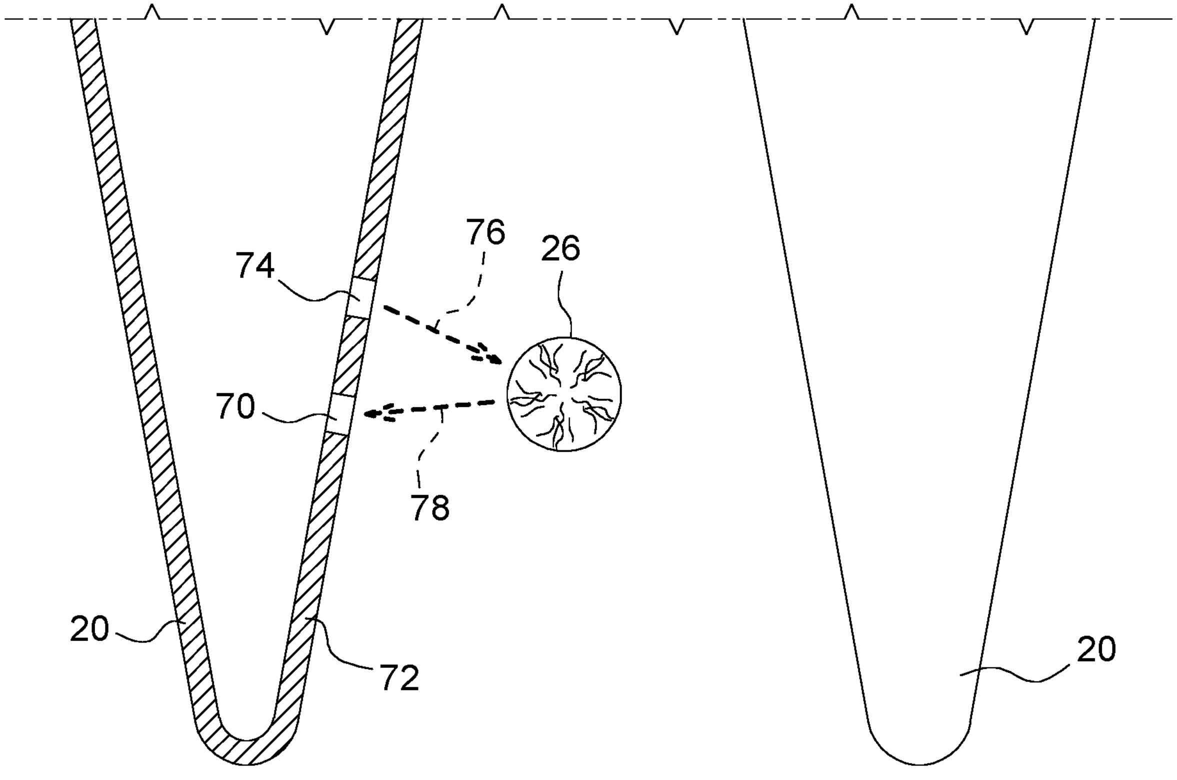
FIG. 3 is a schematic plan view of a portion of the corn row header.

FIG. 3 schematically shows such an on-the-go nitrate sensor 70 mounted on a side wall 72 of a respective one of the snouts 20. The sensor 70 may be mounted on the snout in any suitable fashion. In one embodiment the sensor 70 is embedded in the side wall 72 or mounted flush with the outer surface of the side wall 72 so as to prevent damage to the sensor 70 from impact with the stalks 26 passing through the opening 62.

An electromagnetic energy source 74 may be associated with each sensor 70. The electromagnetic energy source 74 may be separate from or incorporated in each sensor 70. As schematically shown in FIG. 3, the electromagnetic energy source 74 is configured to transmit electromagnetic energy 76 onto the stalks 26 as the stalks 26 are received in the stalk receiving opening 62. And the sensor 70 is oriented to collect reflected electromagnetic energy 78 reflected from the lower end portions of the stalks 26 before the stalks 26 are cut by the row crop header 18.

Alternatively, as schematically shown in FIG. 2, the sensors 70 may be located at alternate locations 70' within the crop row header 18 where the sensors 70 collect reflected electromagnetic energy 78 from the stalks 26 during cutting or after the stalks 26 are cut by the row crop header 18.

Figure 5:
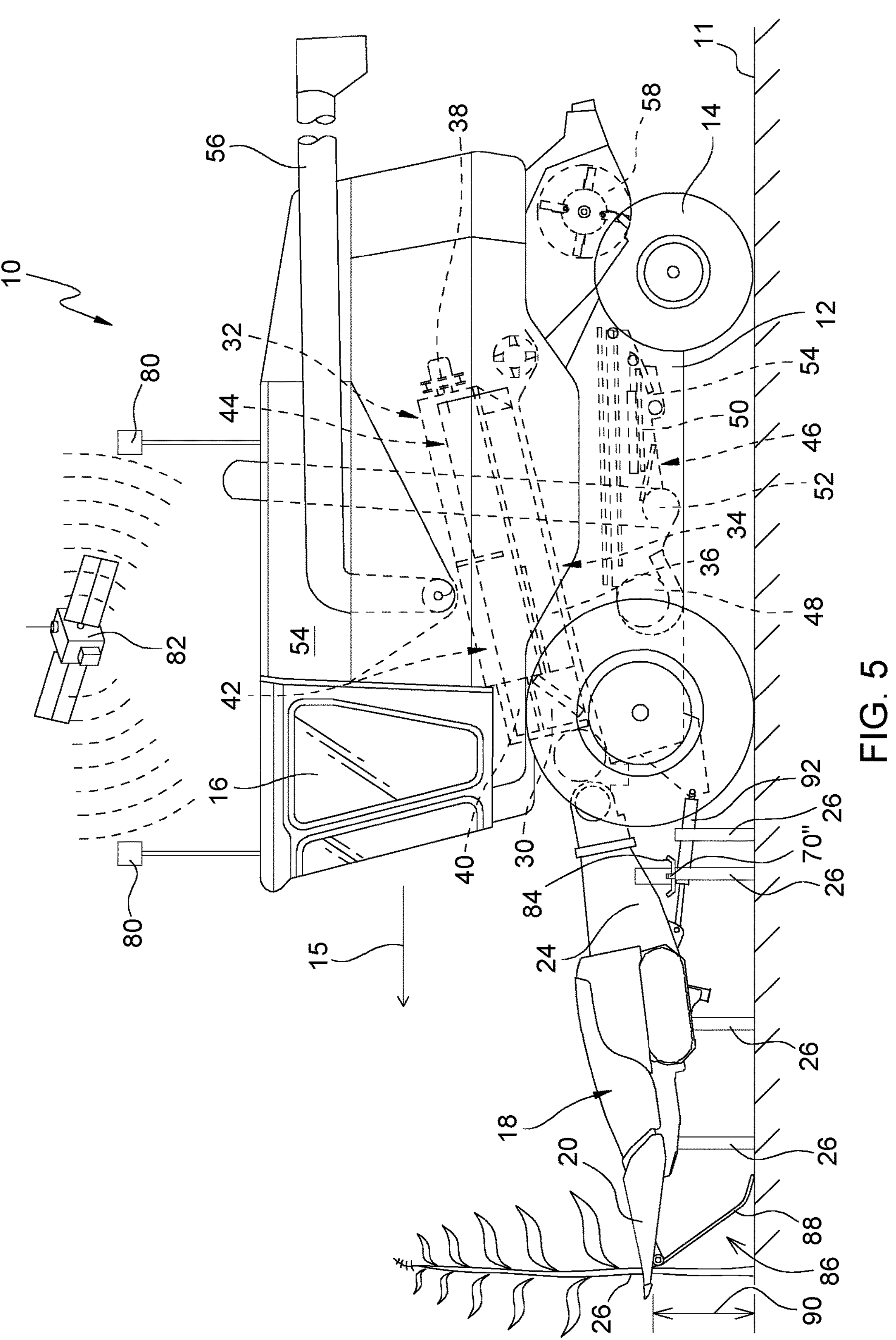
FIG. 5 is a schematic side elevation view of the header of the combine harvester machine including a header height control system.

In a further alternative as shown in FIG. 5, the sensors 70 may be located at alternate locations such as 70" viewing cut stalks 26 standing in the field after the header 18 has passed over the cut stalks. In FIG. 5 the sensors in location 70" are shown mounted in or on a skid 84 supported from a rear portion of the crop header 18. The skid 84 may be configured to skim over the cut tops of the cut stalks so that the sensor 70" is focused on the top of the cut stalks so as to observe most closely the interior of the cut stalk 26.

In a still further embodiment the sensors 70 may be mounted on another part of the combine harvester 10 located behind the crop header 18.

The embodiment of FIG. 5 further shows components of a header height control system 86 including a header height sensor 88 configured to detect a header height 90 above the ground surface 11. The header height sensor 88 is shown in the form of a spring biased mechanical "feeler" which travels along the ground surface. Other types of header height sensors, such as a non-contact sensor like an ultrasonic or laser distance sensor could be used. The header 18 further includes a header height adjustment actuator 92, and a controller 102 configured to receive a header height signal 88S from the header height sensor 88 and to generate a command signal 92S to the header height adjustment actuator 92 to control the header height 90. The controller 102 is further described below.

The on-the-go sensors 70 may be configured as optical sensors configured to use transient infrared reflectance spectroscopy (TIRS), which allows emitted infrared energy 76 from the sensor 70 or its associated electromagnetic energy source 74 to contact stalks 26 adjacent the sensor 70 to determine a concentration of nitrates in the stalks 26 by spectroscopic analysis of the reflected electromagnetic energy 78. Such sensors may target a specific energy or light frequency.

Other forms of infrared reflectance spectroscopy may be used. For example, a broadband near infrared (NIR) spectrometer and light source may be used. Another option is to use a narrowband light source in the form of light emitting diodes (LED's) configured to emit various narrowband NIR beams. A further option is to use a broadband light source and narrowband filter with a simple detector.

A further alternative technology operates based on laser induced breakdown spectroscopy (LIBS). LIBS is a type of atomic emission spectroscopy which uses a highly energetic laser pulse as the excitation source. Such an excitation source may be located in place of the electromagnetic energy source 74 seen in FIG. 3. The laser is focused to form a plasma, which atomizes and excites samples. The formation of the plasma only begins when the focused laser achieves a certain threshold for optical breakdown, which generally depends on the environment and the target material. Atomic emissions from the plasma formed at the stalks 26 are then received by the nitrate sensor 70.

Through the use of any one of the spectroscopic techniques described above the on-the-go sensor 70 detects reflected or emitted electromagnetic energy within the wavelength range associated with the present of nitrates in the stalks, and the sensor 70 generates the nitrate level signal 70S representative of the level of nitrates in the stalks.

The combine harvester 10 further includes at least one position sensor 80 supported from the machine 10 and configured to generate a position signal 80S representative of a position of the combine harvester 10 within an external reference system defined by a satellite based positioning system 82. The position sensors 80 may for example be GPS or GNSS sensors.

Figure 4:
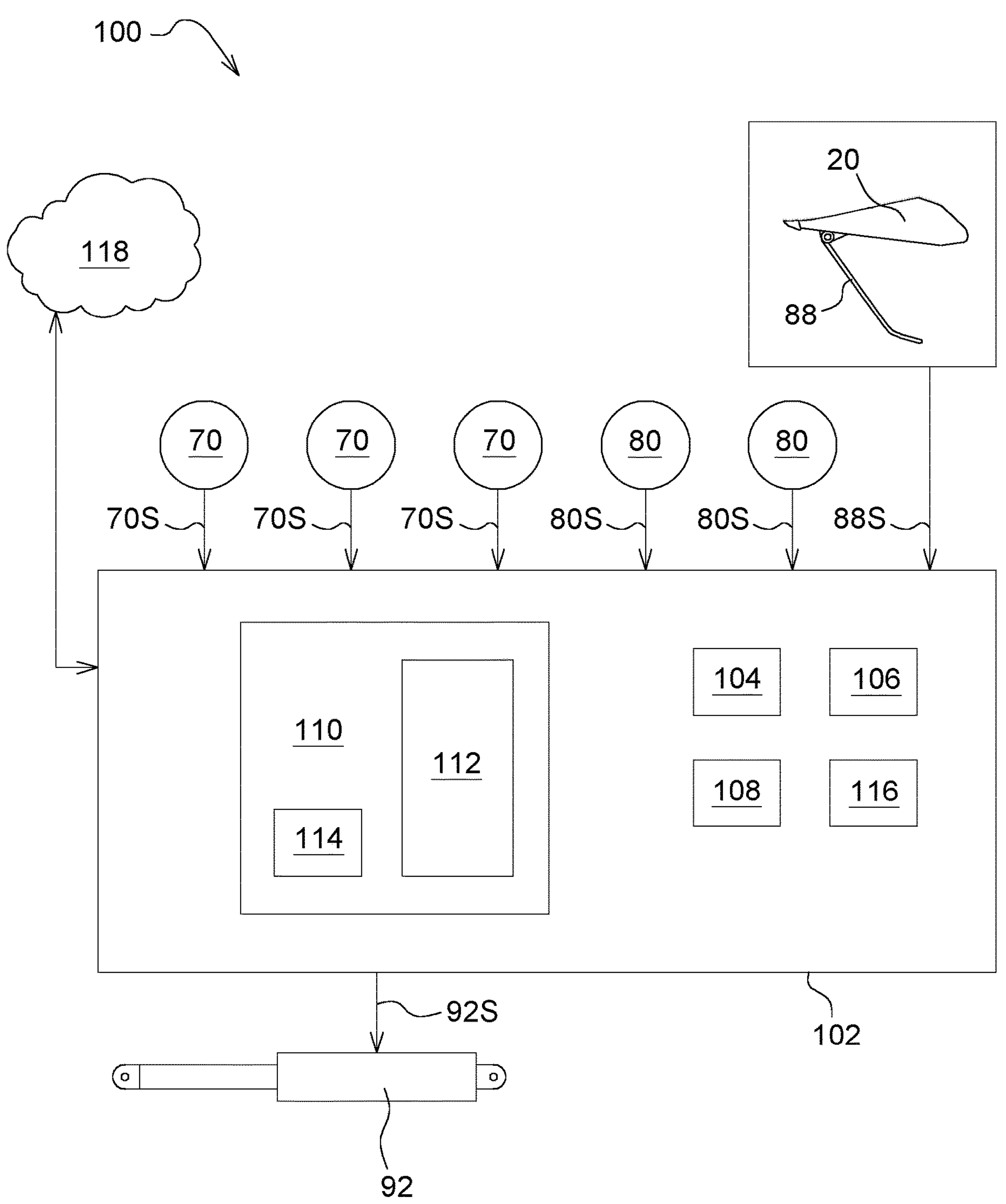
FIG. 4 is a schematic drawing of a control and data management system.

The Control and Data Management System:

FIG. 4 schematically shows a control and data management system 100 of the combine harvester 10. The control and data management system 100 includes a controller 102. The controller 102 may be part of the machine control system of the combine harvester 10, or it may be a separate control module. The controller 102 may for example be mounted in a control panel located at the operator's station 16. Controller 102 is configured to receive input signals from the various sensors. The signals transmitted from the various sensors to the controller 102 are schematically indicated in FIG. 4 by lines connecting the sensors to the controller with an arrowhead indicating the flow of the signal from the sensor to the controller 102.

For example, nitrate level signals 70S are received by the controller 102 from each of the on-the-go nitrate sensors 70. Controller 102 may also receive the position signals 80S from each of the position sensors 80. Controller 102 may also receive a header height signal 88S from the header height sensor 88.

Similarly, the controller 102 may generate control signals for controlling the operation of various actuators of the combine harvester 10. For example, as schematically shown in FIG. 4 a command signal 92S may be sent to the header height adjustment actuator to control the header height 90. The controller 102 may also access topographical data available for the field in which the combine harvester 10 is working, so that the controller may adjust header height in anticipation of upcoming changes in elevation of the terrain. Such topographical data may be stored in the form of a map of field elevations corresponding to GPS coordinates. It will be appreciated that when gathering nitrogen level data throughout a corn field for comparative purposes it is important to gather the data under similar conditions at each location, and it is desirable to gather the data at a consistent height above the ground surface 11. This may be accomplished by maintaining a consistent header height 90 during the data gathering operation.

Controller 102 includes or may be associated with a processor 104, a computer readable medium 106, a data base 108 and an input/output module or control panel 110 having a display 112. An input/output device 114, such as a keyboard, joystick or other user interface, is provided so that the human operator may input instructions to the controller. It is understood that the controller 102 described herein may be a single controller having all of the described functionality, or it may include multiple controllers wherein the described functionality is distributed among the multiple controllers.

Various operations, steps or algorithms as described in connection with the controller 104 can be embodied directly in hardware, in a computer program product 116 such as a software module executed by the processor 104, or in a combination of the two. The computer program product 116 can reside in RAM memory, flash memory, ROM memory, EPROM memory, EEPROM memory, registers, hard disk, a removable disk, or any other form of computer-readable medium 106 known in the art. An exemplary computer-readable medium 106 can be coupled to the processor 104 such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

The data storage in computer readable medium 106 and/or database 108 may in certain embodiments include a database service, cloud databases, or the like. In various embodiments, the computing network may comprise a cloud server, and may in some implementations be part of a cloud application 118 wherein various functions as disclosed herein are distributed in nature between the computing network and other distributed computing devices. Any or all of the distributed computing devices may be implemented as at least one of an onboard vehicle controller, a server device, a desktop computer, a laptop computer, a smart phone, or any other electronic device capable of executing instructions. A processor (such as a microprocessor) of the devices may be a generic hardware processor, a special-purpose hardware processor, or a combination thereof.

In particular, the controller 102 may be configured to receive the position signals 80S and the nitrate level signals 70S and to store data representative of the nitrate level signals 70S in association with data representative of the position signals 80S. Such associated data provides a mapping of nitrate level information corresponding to geographic locations within a field in which the corn crop is grown. As noted above the controller 102 may include various cloud based operations, and the data storage relating to the nitrate level signals may be sent to the cloud 118 where further processing and analysis could be performed. The cloud based analysis may for example be performed via a command center such as the John Deere® Operations Center.

The controller 102 may be further configured to correlate the data representative of the nitrate level signals 70S with historical nitrogen management data for the positions within the external reference system stored in the data base 108 of the controller 102.

Data representative of the nitrate level signals 70S may also be displayed on display 112 for viewing by the operator of the combine harvester 10 in real-time. Such data may be displayed in alpha-numeric fashion. Such data may be displayed in graphic fashion. Such data may be displayed as a map with various visual indicia such as colors or cross-hatching indicated relative levels of the nitrate level signals, e.g. deficient, optimal or excessive.

Subsequent analysis of the data by the controller 102 may identify preferred nitrogen management practices, e.g. fall nitrogen application versus in-season nitrogen application.

Such analysis may identify soils that have better performance than other soils to identify potential for variable rate strategies for future nitrogen fertilizer applications.

Additionally, soils consistently optimal could be used as a reference strip for in-season fertilizer applications.

Such analysis may also include analysis of historical weather events that contribute to crop losses so those events can better inform future strategies or decisions, e.g. improve timing of nitrogen application or identify when additional nitrogen applications are warranted because deficiencies are likely to occur.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. An agricultural machine configured to harvest a crop having stalks, comprising:

a main frame;

a plurality of wheels or tracks supporting the main frame from a ground surface and configured to drive the agricultural machine in a forward direction to harvest the crop;

a crop header mounted on the main frame and including a header frame extending transversely to the forward direction and having a transverse width, the crop header being configured to receive stalks of the crop to be cut by the crop header as the agricultural machine moves in the forward direction;

at least one on-the-go nitrate sensor mounted on the agricultural machine and oriented to collect electromagnetic energy reflected from or emitted by the stalks, the sensor being configured to generate a nitrate level signal representative of a nitrate level in the stalks;

at least one position sensor supported from agricultural machine and configured to generate a position signal representative of a position of the agricultural machine within an external reference system defined by a satellite based positioning system; and a controller configured to receive the position signal and the nitrate level signal and to store data representative of the nitrate level signal in association with data representative of the position signal.

2. The agricultural machine of claim 1, wherein:

the controller includes a database having historical nitrogen management data correlated with positions within the external reference system stored in the database; and the controller is further configured to correlate the data representative of the nitrate level signal with the historical nitrogen management data for the positions within the external reference system.

3. The agricultural machine of claim 1, wherein:

the at least one on-the-go nitrate sensor includes a plurality of on-the-go nitrate sensors mounted on the crop header and spaced across the transverse width of the crop header.

4. The agricultural machine of claim 1, wherein:

the at least one on-the-go nitrate sensor is configured to operate based on infrared reflectance spectroscopy.

5. The agricultural machine of claim 1, wherein:

the at least one on-the-go nitrate sensor is configured to operate based on laser induced breakdown spectroscopy.

6. The agricultural machine of claim 1, wherein:

the at least one on-the-go nitrate sensor is mounted on the crop header.

7. The agricultural machine of claim 6, further comprising:

a header height control system including a header height sensor configured to detect a header height above a ground surface, a header height adjustment actuator, and a controller configured to receive a header height signal from the header height sensor and to generate a command signal to the header height adjustment actuator to control the header height.

8. The agricultural machine of claim 1, wherein:

the crop header includes a plurality of snouts attached to the header frame and spaced across the transverse width of the header frame, such that two adjacent snouts define a stalk receiving opening therebetween for receiving the stalks of the crop; and the at least one on-the-go nitrate sensor is mounted on a side wall of at least one of the snouts.

9. The agricultural machine of claim 1, further comprising:

an operator's station including a visual display; and a controller configured to receive the nitrate level signal and to display data representative of the nitrate level signal on the visual display in real-time.

10. The agricultural machine of claim 1, wherein:

the crop header is configured for harvesting corn.

11. The agricultural machine of claim 1, wherein:

the crop header includes a plurality of snouts attached to the header frame and spaced across the transverse width of the header frame, such that two adjacent snouts define a stalk receiving opening therebetween for receiving the stalks of the crop; and the agricultural machine further includes an electromagnetic energy source mounted on at least one of the snouts and configured to transmit electromagnetic energy onto the stalks received in the stalk receiving opening.

12. The agricultural machine of claim 1, wherein:

the at least one on-the-go nitrate sensor is oriented to collect electromagnetic energy reflected from or emitted by the stalks before the stalks are cut by the crop header.

13. The agricultural machine of claim 1, wherein:

the at least one on-the-go nitrate sensor is oriented to collect electromagnetic energy reflected from or emitted by the stalks during cutting or after the stalks are cut by the crop header.

14. A method of automatically performing an end-of-season stalk nitrate test when harvesting a crop having stalks, comprising:

harvesting the crop with a crop header including a header frame extending transversely to a forward harvesting direction, the crop header being configured to cut stalks of the crop as the agricultural machine moves in the forward harvesting direction;

collecting electromagnetic energy reflected from or emitted by the stalks with at least one on-the-go nitrate sensor;

generating a nitrate level signal with the at least one on-the-go nitrate sensor representative of a nitrate level in the stalks;

generating a position signal representative of a position of the agricultural machine within an external reference system defined by a satellite based positioning system;

receiving the position signal and the nitrate level signal in a controller; and storing data representative of the nitrate level signal in association with data representative of the position signal in a computer readable medium associated with the controller.

15. The method of claim 14, further comprising:

controlling a header height of the crop header so that the collecting electromagnetic energy is performed at a consistent height above a ground surface.

16. The method of claim 14, further comprising:

correlating the data representative of the nitrate level signal with historical nitrogen management data for the positions within the external reference system stored in a database of the controller.

17. The method of claim 14, wherein:

the collecting step further includes collecting the electromagnetic energy reflected from or emitted by lower end portions of the stalks before the stalks are cut by the crop header.

18. The method of claim 14, wherein:

the collecting step further includes collecting the electromagnetic energy reflected from or emitted by lower end portions of the stalks during cutting or after the stalks are cut by the crop header.

* * * * *